(12) United States Patent
Duffy et al.

(10) Patent No.: US 9,079,662 B1
(45) Date of Patent: Jul. 14, 2015

(54) CO-OPERATIVE, MODULAR, UNMANNED, VERTICAL LIFT CARGO VEHICLES

(71) Applicants: Michael J. Duffy, Propect Park, PA (US); John J. Mattero, Media, PA (US); Andrew Feit, Minneapolis, MN (US)

(72) Inventors: Michael J. Duffy, Propect Park, PA (US); John J. Mattero, Media, PA (US); Andrew Feit, Minneapolis, MN (US)

(73) Assignee: The Boeing Company, Chicago, IL (US)

( * ) Notice: Subject to any disclaimer, the term of this patent is extended or adjusted under 35 U.S.C. 154(b) by 263 days.

(21) Appl. No.: 13/632,370

(22) Filed: Oct. 1, 2012

(51) Int. Cl.
  B64D 1/22 (2006.01)
  B64C 37/02 (2006.01)
  G05D 1/08 (2006.01)

(52) U.S. Cl.
  CPC .. B64C 37/02 (2013.01); B64D 1/22 (2013.01)

(58) Field of Classification Search
  CPC ............... B64D 1/22; B64C 2201/128; B64C 2201/141; B64C 2201/146; B64C 37/02; G05D 1/0856
  USPC ....................................... 701/3; 318/384, 385
  See application file for complete search history.

(56) References Cited

U.S. PATENT DOCUMENTS

| 3,656,723 A * | 4/1972 | Piasecki et al. | 244/2 |
| 3,743,214 A * | 7/1973 | Maciolek | 244/2 |
| 2009/0299551 A1* | 12/2009 | So et al. | 701/3 |
| 2014/0025238 A1* | 1/2014 | So et al. | 701/3 |

OTHER PUBLICATIONS

Mittal et al., Comparison of Stability and Control Characteristics of Two Twin-Lift Helicopter Configurations, Feb. 13, 1991, Kluwer Academic Publishers, Nonlinear Dynamics 3: 199-223, 1992.*
Mahboubi, Zouhair; Kolter, Zico; Wang, Tao; Bower, Geoffrey; Ng, Andrew Y.; "Camera Based Localization for Autonomous UAV Formation Flight", AIAA Infotech, Mar. 29-31, 2011.
Mellinger, Daniel; Shomin, Michael; Michael, Nathan; Kumar, Vijay; "Cooperative Grasping and Transport using Multiple Quadrotors", Distributed Autonomous Robotic Systems, Lausanne, Switzerland, Nov. 2010.
Mellinger, Daniel; Michael, Nathan; Kumar, Vijay; "Trajectory Generation and Control for Precise Aggressive Maneuvers with Quadrotors"; The International Journal of Robotics Research 2012 31: 664-674.
Carter, Edward S.;"Implication of Heavy Lift He Licopter Size Effect Trends and Multilift Options for Filling the Need"; Eighth European Rotorcraft Forum; Aug. 31 through Sep. 3, 1982.

* cited by examiner

*Primary Examiner* — Fadey Jabr
*Assistant Examiner* — Thomas Ingram
(74) *Attorney, Agent, or Firm* — Felix L. Fischer

(57) ABSTRACT

A cargo lift system employs multiple unmanned lift vehicles acting as vertical lift generating machines. An autonomous control system controls coordinated movements of the cooperating unmanned vertical lift generating machines. A coupling system connects the cargo load to each of the plurality of unmanned vertical lift generating machines. The plurality of unmanned vertical lift generating machines are separated from each other by a distance through spacing by individual onboard flight computers in the lift generating machines or by rigid or semi-rigid connections between the lift generating machines.

19 Claims, 14 Drawing Sheets

CO-OPERATIVE, MODULAR, UNMANNED, VERTICAL LIFT CARGO VEHICLES

BACKGROUND INFORMATION

1. Field

Embodiments of the disclosure relate generally to the field of vertical lift cargo vehicles and more particularly to a vertical lift system employing one or more UAV's incorporating control and interconnection systems to cooperatively lift payloads of various sizes with the number of UAVs employed determined by the payload size.

2. Background

Vertical lift systems for moving personnel and cargo have become ubiquitous in modern military and civil transportation. Helicopters range in size from light personnel carrying machines such as the Robinson R-22 or Bell OH-58 Kiowa to very large cargo lifting vehicles such as the Sikorsky CH-53 Sea Stallion or Boeing Vertol CH-47Chinook, which are dual purpose personnel or cargo transport, or cargo dedicated vehicles such as the Sikorsky S-64 Skycrane or Kaman KMAX. Heavy lift vehicles such as the Skycrane or KMAX often provide more lift performance than necessary for smaller cargo tasks. Both large capacity cargo dedicated systems and dual purpose systems are often expensive to design, operate and maintain. It is therefore desirable to provide a vertical lift cargo system that can be matched to varying cargo lift requirements

SUMMARY

Embodiments disclosed herein provide a cargo lift system employing a plurality of unmanned lift vehicles acting as vertical lift generating machines. An autonomous control system controls coordinated movements of the plurality of unmanned vertical lift generating machines. A coupling system connects the cargo load to each of the plurality of unmanned vertical lift generating machines. The plurality of unmanned vertical lift generating machines are separated from each other by a distance through spacing by individual onboard flight computers in the lift generating machines or by rigid or semi-rigid connections between the lift generating machines.

Operation of the embodiments disclosed for cargo lift may be accomplished by determining a load weight and configuration and selecting a number of individual lift vehicles required to provide the necessary lift. The individual lift vehicles are then assembled into a multiple vehicle configuration (MVC). If the MVC is to be operated without physical connection between lift vehicles, individual lift vehicle control is implemented through an onboard flight controller in each lift vehicle to maintain lift vehicle separation using vehicle encoded mutual range sensing. Autonomous control of the MVC is provided by an elected master controller with individual collective and cyclic control of each lift vehicle by an onboard flight computer for MVC flight path control. If the MVC is operated with physical connection with semi-rigid beams, the beams are connected between lift vehicles of the MVC to a ball joint in an interconnection and load support module of each lift vehicle. Autonomous control of the MVC is provided by the master controller with individual collective and cyclic control of each lift vehicle by each onboard flight computer for MVC flight path control. If the MVC is operated with physical connection with rigid beams, the beams are connected between lift vehicles of the MVC to a rigid connection in the in the interconnection and load support module of each lift vehicle. Autonomous control of the MVC is then provided by the master controller with individual collective and cyclic control of each lift vehicle by each onboard flight computer for MVC flight path control. Alternatively for MVCs with three or four lift vehicles, autonomous control of the MVC is accomplished with individual collective control of each lift vehicle by each onboard flight controller responsive to the autonomous controller for pitch and roll control of the MVC for MVC flight path control.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a vertical lift system with multiple lift vehicles operating as vertical lift generating machines that can modularly interact to cooperatively lift varying payloads. Connection between the lift vehicles can be rigid, flexible or by control system interaction only. Small loads may be lifted with one lift vehicle, larger loads with two interconnected lift vehicles, yet larger loads with three interconnected lift vehicles and maximum loads with four or more interconnected lift vehicles.

Figure 1A:
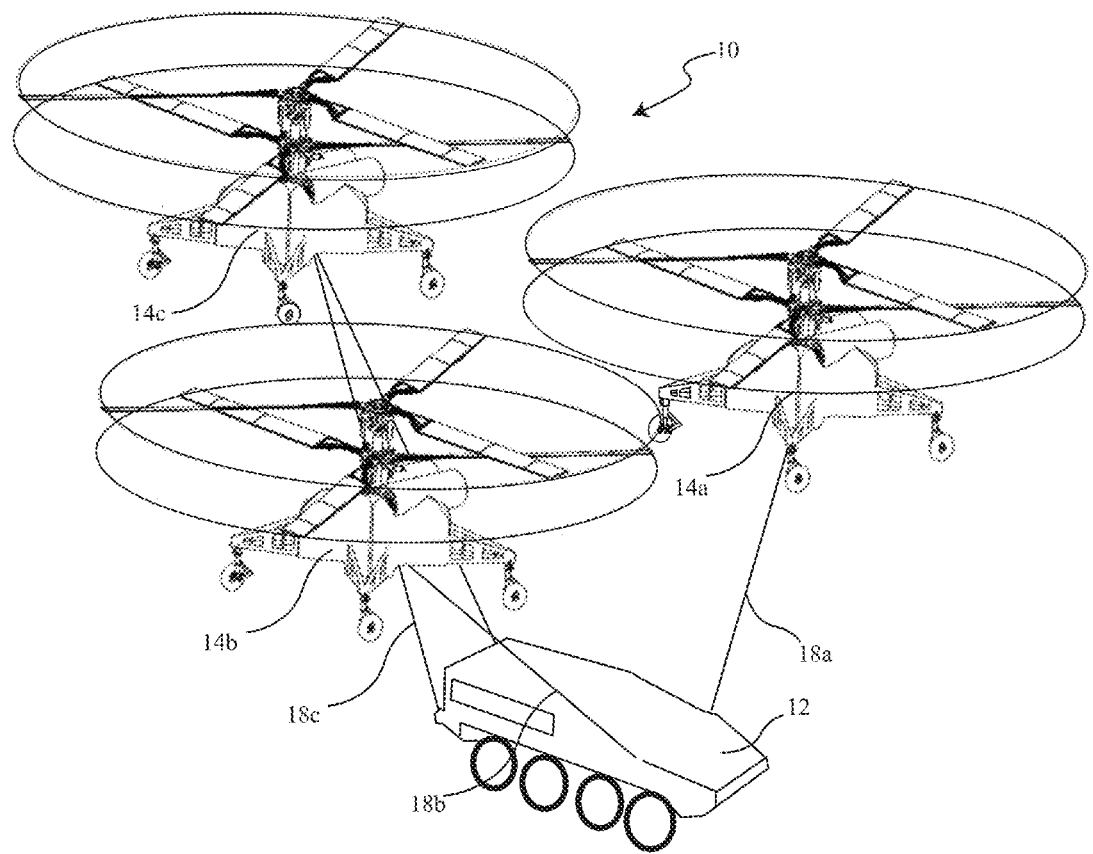
FIG. 1A is a pictorial view of an exemplary embodiment with communication coupling between the vertical lift vehicles.
Figure 1B:
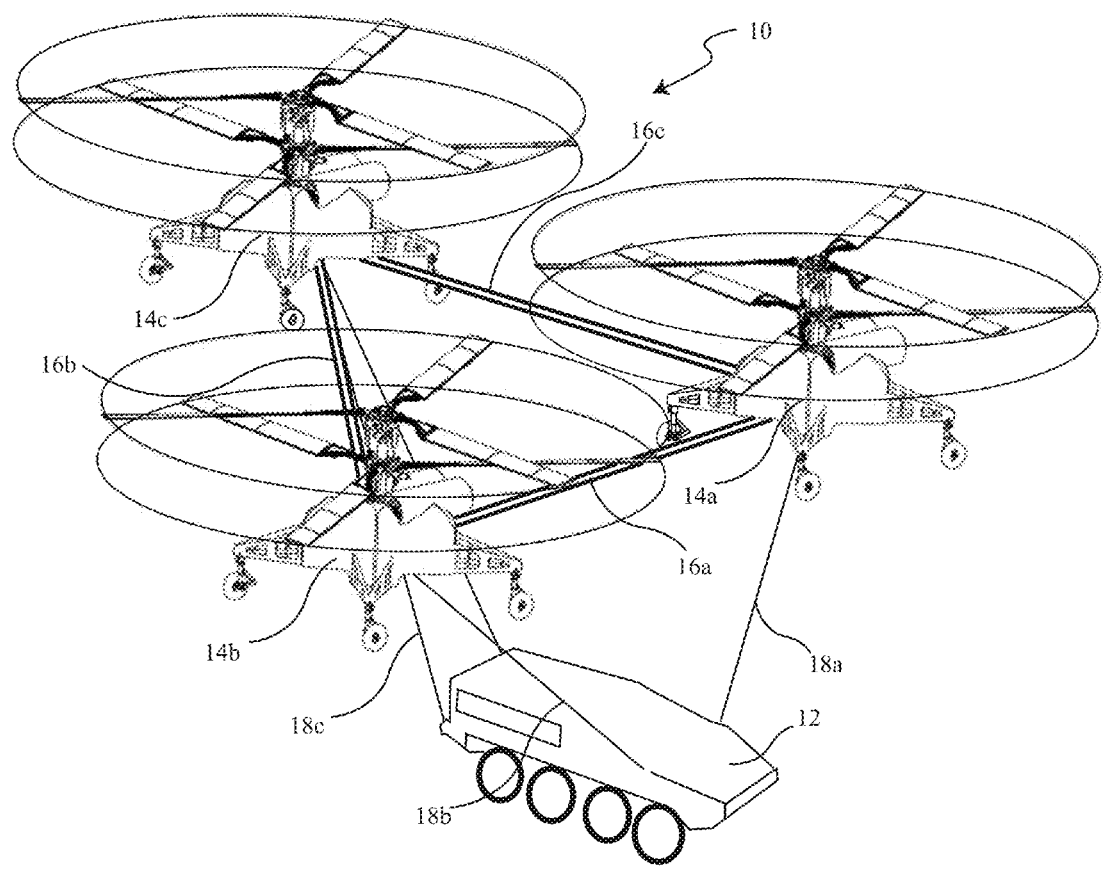
FIG. 1B is a pictorial view of an exemplary embodiment with physical coupling between the vertical lift vehicles in addition to communication coupling.

Referring to the drawings, FIGS. 1A and 1B show exemplary cases for a modularly connected vertical lift vehicle system 10 lifting of a payload 12 using three lift vehicles 14a, 14b and 14c supporting the payload with cables 18a, 18b and 18c. For the embodiment shown in FIG. 1A, the lift vehicles are not physically connected but operate cooperatively using mutual sensing and communication for maintaining spacing and cooperative lift and movement of the payload 12 as will be described in greater detail subsequently. For the embodiment shown in FIG. 1B, interconnection of the vehicles using connection beams 16a, 16b and 16c is employed with vehicle interaction as will be described in greater detail subsequently. Payload 12 is supported by cables 18a, 18b and 18c from the lift vehicles.

Figure 2A:
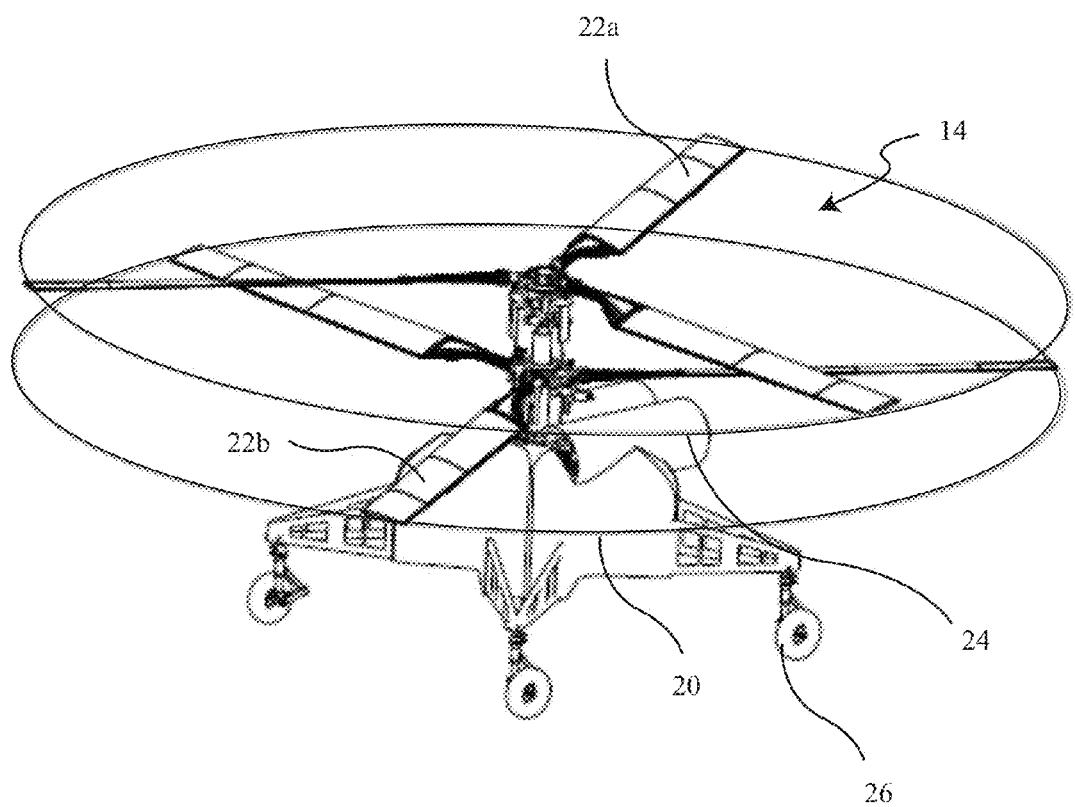
FIG. 2A is an isometric view of one example vehicle employed in the embodiment of FIG. 1.
Figure 2B:
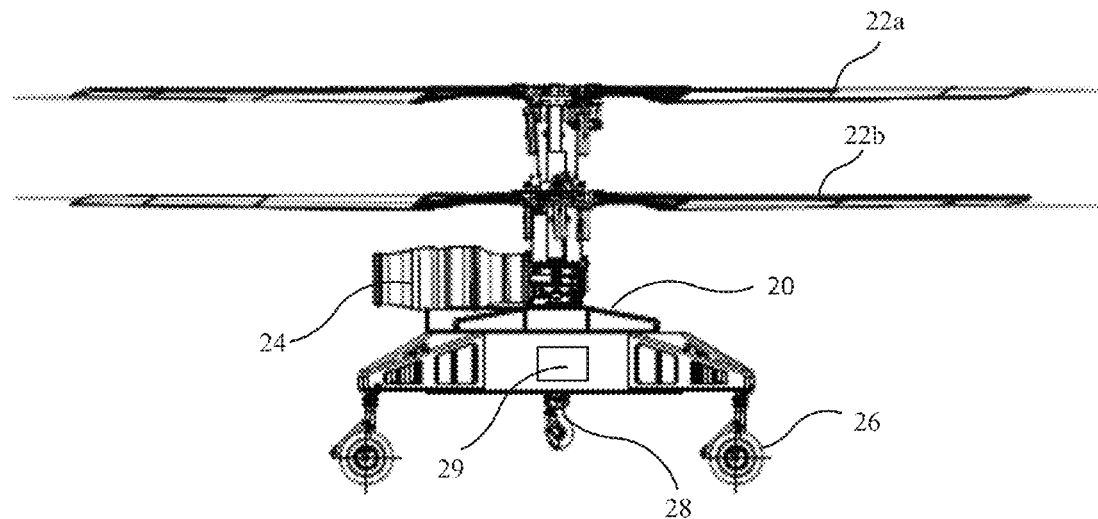
FIG. 2B is a side view of the vehicle.
Figure 2C:
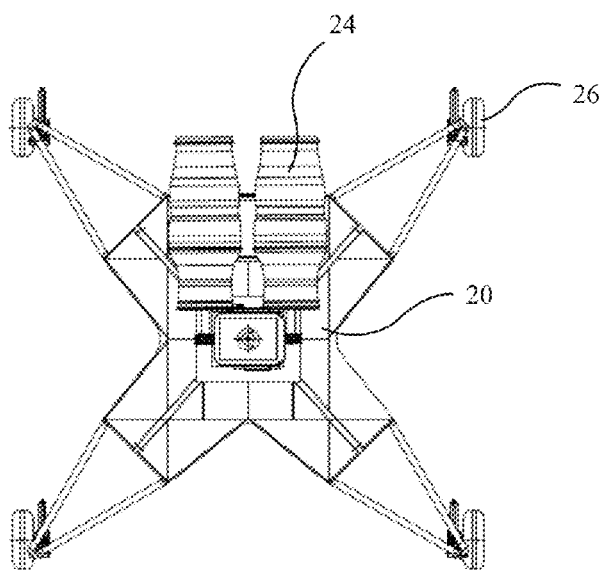
FIG. 2C is a top view of the vehicle with the rotor disk removed for clarity.

Details of an example embodiment for the modular lift vehicles 14 are shown in FIGS. 2A, 2B and 2C. A fuselage 20 provides a base structure for the vehicle with co-axial, counter-rotating rotor discs 22a and 22b driven by a propulsion unit 24. Landing gear 26 support the vehicle on the ground when not in use. An interconnection and load support module 28 is provided for interconnection between the vehicles and as a coupling system for connection of load cables or slings to carry the load 12. In alternative embodiments, the vehicle interconnection elements and load coupling system may be separately accommodated. A sensor suite 29 including elements such as and inertial measurement unit (IMU) and/or global positioning system (GPS), video cameras, laser imaging, detection and ranging (LIDAR) and/ or radar sensors are provided for navigation and control as well as mutual position sensing for lift vehicles operating cooperatively. For an example vehicle, 45 ft. diameter rotors with a 4.5 ft axial spacing are employed. The propulsion unit provides a total of 8,888 shp in an example embodiment using one or more turboshaft engines such as GE-38B by General Electric. With an empty weight of 12,000 lbs and 3,000 lbs of fuel for approximately 200 nm range, payload of 15,000 lbs results in a total gross weight of the lift vehicle of approximately 30,000 lbs.

Figure 3:
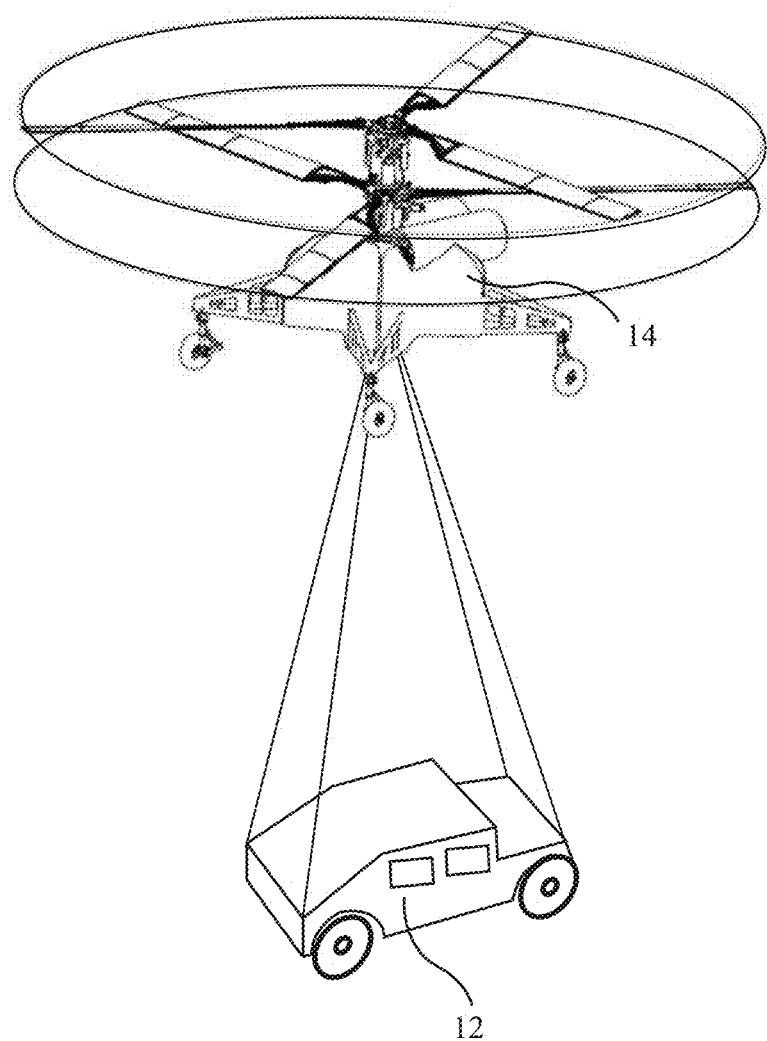
FIG. 3 is a pictorial view of an example of load matching with a single vehicle.
Figure 4A:
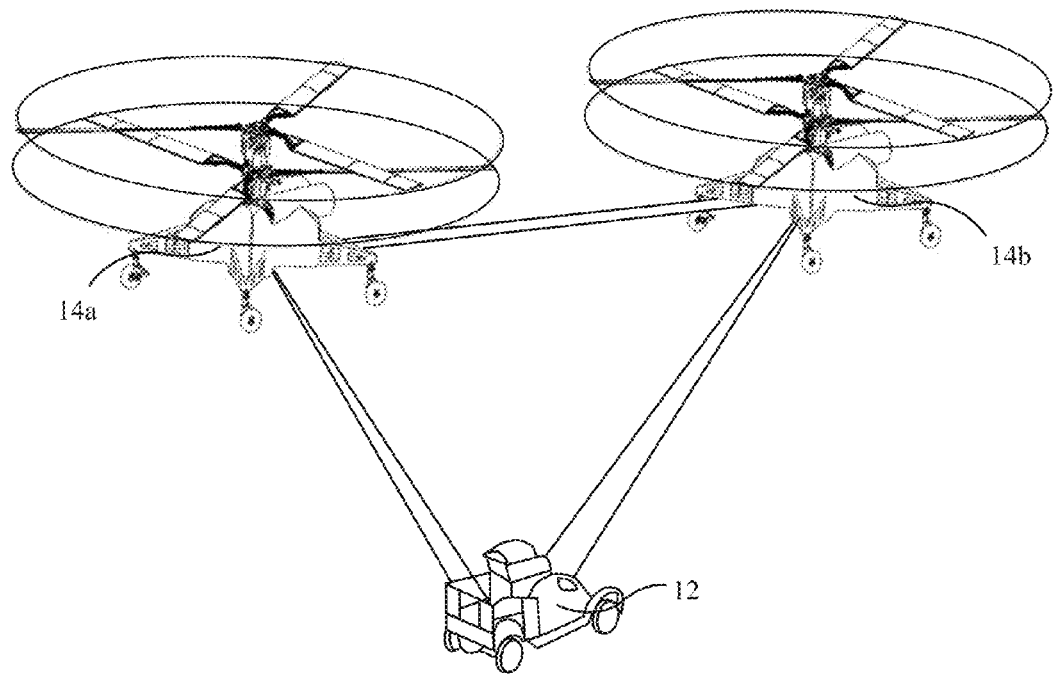
FIG. 4A is a pictorial view of an example of load matching with a cooperative pair of lift vehicles.
Figure 4B:
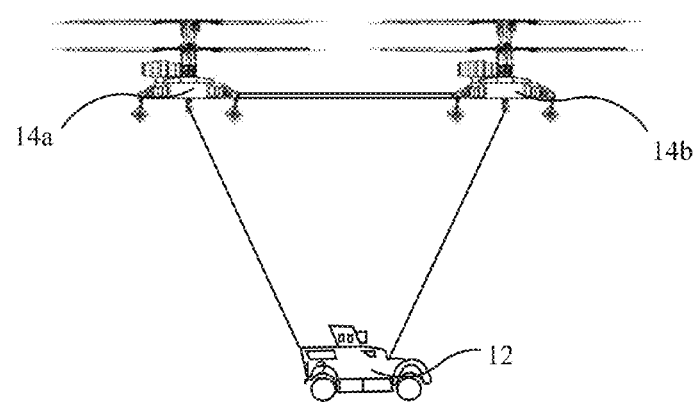
FIG. 4B is a side view of the cooperative pair of lift vehicles.
Figure 5A:
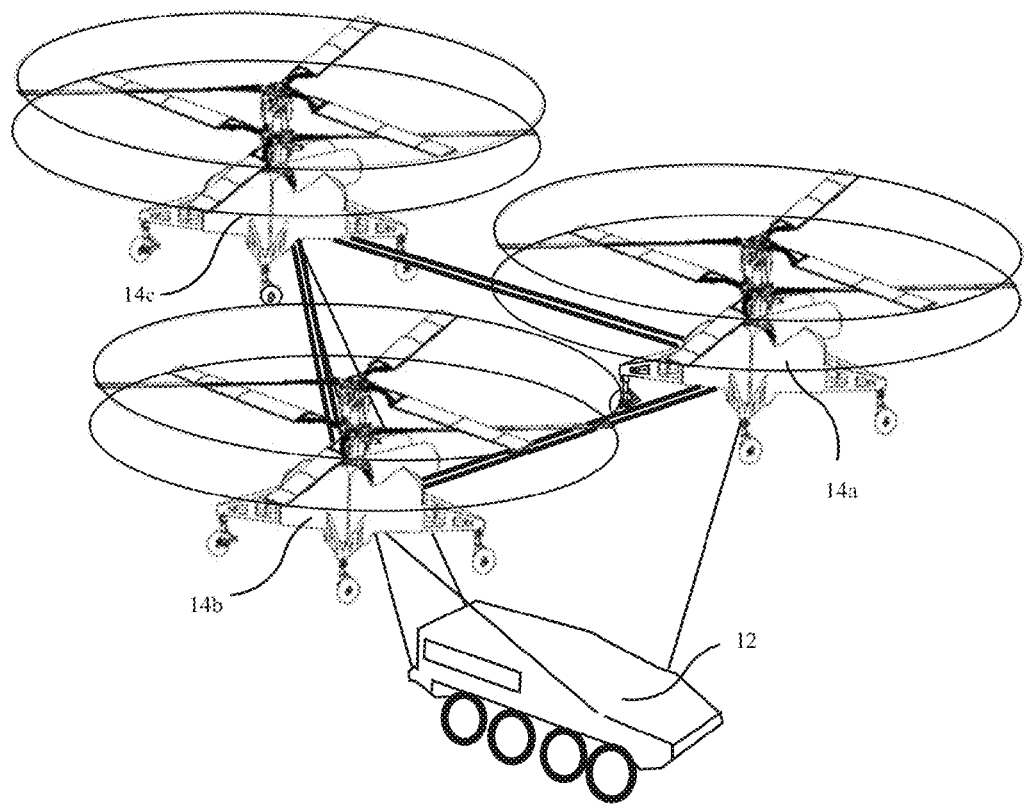
FIG. 5A is a pictorial view of an example of load matching with a cooperative triplet of lift vehicles.
Figure 5B:
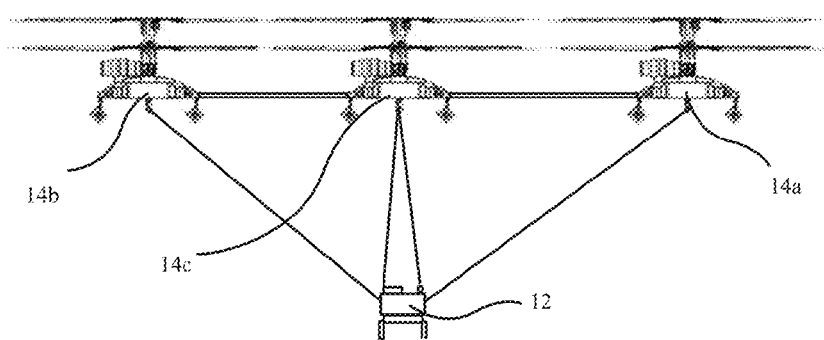
FIG. 5B is a front view of the cooperative triplet of lift vehicles.
Figure 6A:
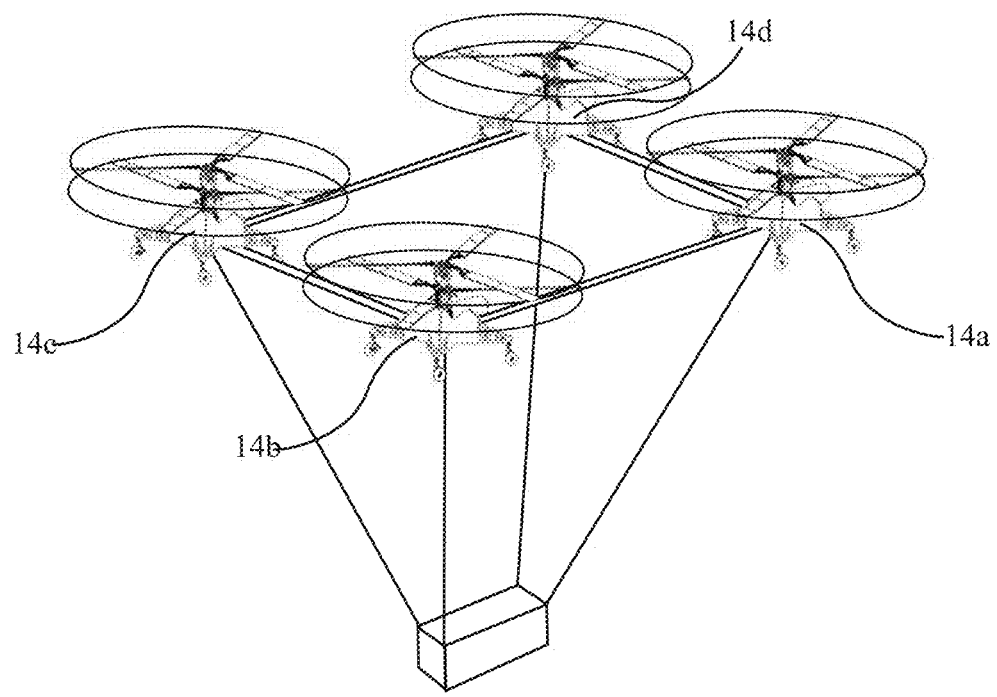
FIG. 6A is a pictorial view of an example of load matching with a cooperative quadruplet of lift vehicles.
Figure 6B:
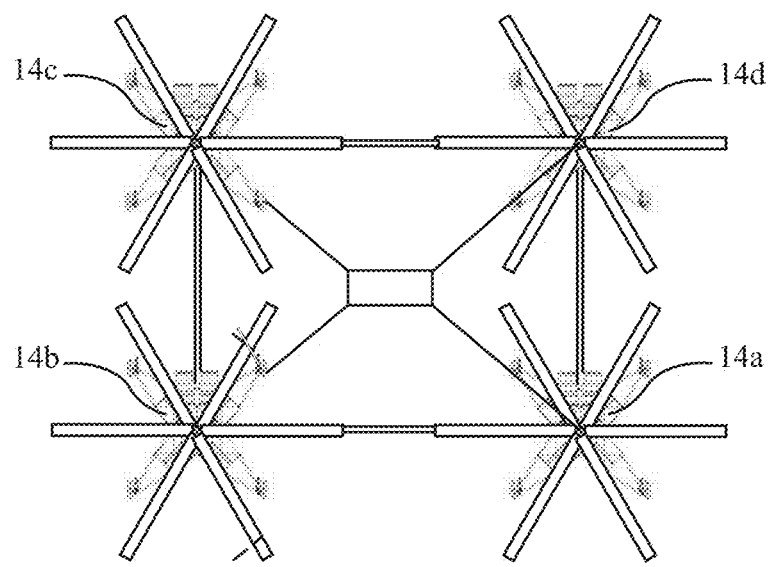
FIG. 6B is a top view of the cooperative quadruplet of lift vehicles.

Depending on cargo load, the modular lift vehicles 14 may operate independently as shown in FIG. 3, or with multiple vehicle configurations (MVC) as a cooperative pair, 14a, 14b, (MVC2) as shown in FIGS. 4A and 4B, a cooperative triplet 14a, 14b and 14c (MVC3) as shown in FIGS. 5A and 5B or a cooperative quadruplet, 14a, 14b, 14c and 14d (MVC4) as shown in FIGS. 6A and 6B. In each example case, the interconnection between the vehicles shown is a beam connection which may be rigid or semi-rigid, as will be described in greater detail subsequently, however, the cooperating lift vehicles may operate at a spaced distance without physical interconnection as will also be described subsequently. Example loads for a single lift vehicle would be a payload of between 10,000 and 15,000 lbs such as a HUMVEE military vehicle or commercial loads such as 463 L pallets, logging or fire fighting loads. A MVC2 may be employed for a payload of between 15,000 and 30,000 lbs such as a M-ATV or commercial loads such as high rise construction or oil and gas rig payloads. A MVC3 may lift between 30,000 and 45,000 lbs for such loads as a STRYKER combat vehicle or commercial loads such as high rise construction or oil and gas rig payloads. A MVC4 may lift between 45,000 and 60,000 lbs to accommodate portable fuel tanks, construction equipment, high rise construction or oil and gas rig payloads.

The modular cooperative system for carrying loads with multiple lift vehicles provides an individual lift vehicle control system that adjusts, as a function of the MVC and the position of the individual lift vehicle within the configuration to compute a desired attitude and position with respect to the other lift vehicles. Formation flight algorithms known in the art may be employed as an autonomous control system to cooperatively "fly" the MVC under common guidance by an elected master controller or similar approach with each lift vehicle controlled by an onboard flight computer as will be described in greater detail subsequently. Communications between the individual lift vehicles in the MVC may employ a wireless system such as a radio interlink or other communication system including a wired or optical fiber system where physical interconnection of the lift vehicles in the MVC is present. Each flight computer would be used to process the incoming sensor data, and apply the control algorithm to direct each individual vehicle to act as cooperative system when linked with other vehicles.

Figure 7A:
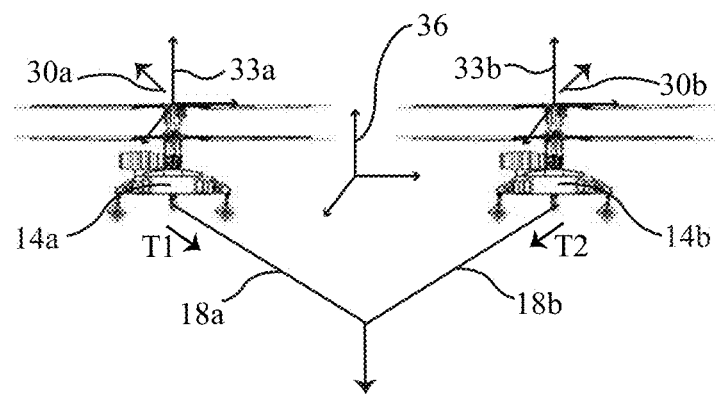
FIG. 7A is an example of cooperative interaction by lift vehicles with no physical connection.
Figure 7B:
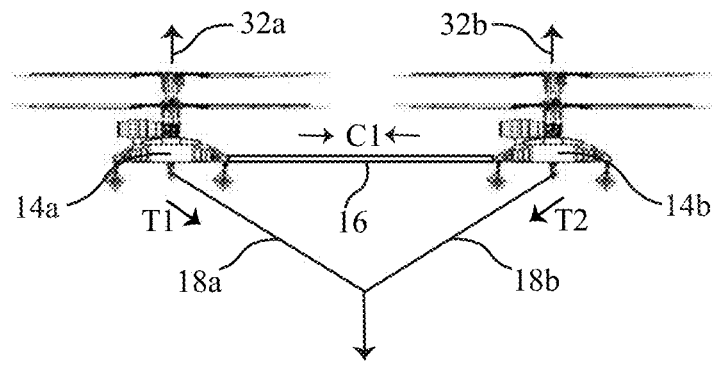
FIG. 7B is an example of cooperative interaction by lift vehicles with a semi-rigid connection.
Figure 7C:
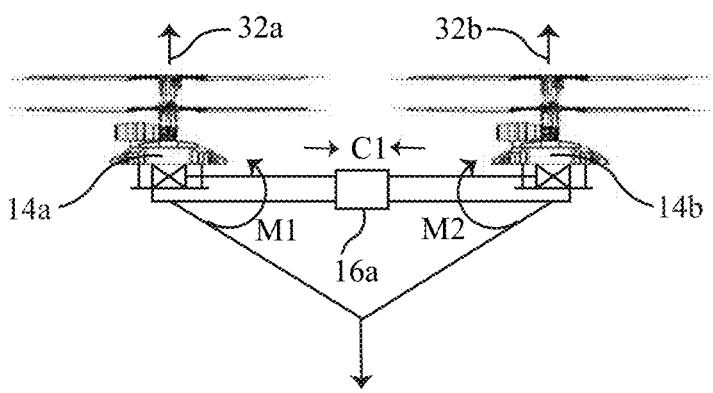
FIG. 7C is an example of cooperative interaction by lift vehicles with a rigid physical connection.

Cooperative operation of the modular lift vehicles can be accomplished with control system interaction only and no physical connection as shown in FIG. 7A with an exemplary MVC2 configuration having vehicles 14a and 14b. The control systems of the lift vehicles maintain a safe operating distance between individual lift vehicles. Physical connection between lift vehicles can be accomplished with a semi-rigid connection shown in FIG. 7B having a beam 16 interconnecting vehicles 14a and 14b with pinned connection provided by ball joints as will be described in greater detail subsequently. A rigid connection can also be accomplished with a beam 16a as shown in FIG. 7C. With no physical connection as shown in FIG. 7A, the lift provided by the rotors of the lift vehicle must have a lateral component as shown by vectors 30a and 30b to accommodate the lateral component of the tension T1 and T2 on cables 18a and 18b created by supporting the load from the cooperative lift vehicles 14a and 14b (thrust effects to counter weight of the vertical lift units themselves are not shown for simplicity). Interconnecting the lift vehicles 14a and 14b with a beam 16 or 16a, as a pinned connection or rigidly, allows compressive load C1 to be carried by the beam between the lift vehicles to accommodate the lateral component of the load tension T1 and T2 (or the associated moments M1 and M2 in the rigid case) allowing the rotor lift to be directly fully vertically as represented by vectors 32a and 32b which improves lift efficiency of the cooperative system.

With no physical connection between the lift vehicles as shown in FIG. 7A (and FIG. 1A), all vehicles can move independent of one another in space, and have full cyclic and collective controls for tilting the rotor disk plane. Each unit is operated and controlled in its own coordinate system, 33a, 33b. Pitch, roll and yaw of total cooperative system is done by coordinating each vehicle independent of one another. A virtual MVC coordinate system 36, as described in detail subsequently, may be employed to have all vehicles fly under common control. Each vertical lift vehicle would still independently move; however, they would have target flight paths defined by the MVC coordinate system, to keep them working as a cooperative team, and to minimize variable tension on the cables between the load and the vertical lift vehicles.

Figure 8:
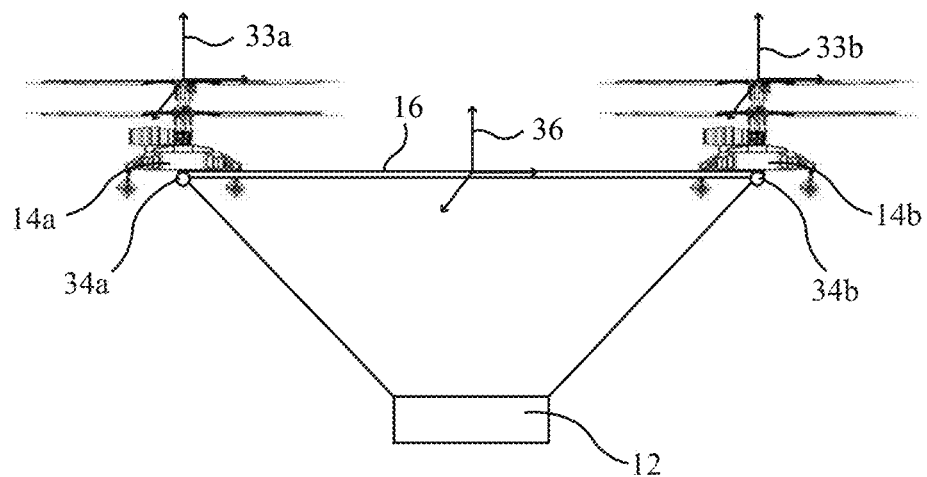
FIG. 8 is a schematic diagram of elements of a semi-rigid connection of lift vehicles.

With a semi-rigid connection, the details of vehicle interaction are shown in FIG. 8 (and FIG. 1B). Lift vehicles 14a and 14b are interconnected by beam 16 with ball joints 34a and 34b. Lift vehicle 14a and lift vehicle 14b have full cyclic and collective for disk tilt. All lift vehicles in the MVC can rotate freely but are linked in translation by the beam(s) which also provide compression reaction for the lateral components of load tension as previously described. All lift vehicles in the MVC use the total system coordinate system 36 for relative cooperative control in carrying the load 12. Each vehicle behaves as part of the total system under control of the master controller. Pitch, roll and yaw of total system are done by coordinating each lift vehicle independent of other lift vehicles in the MVC.

Figure 9:
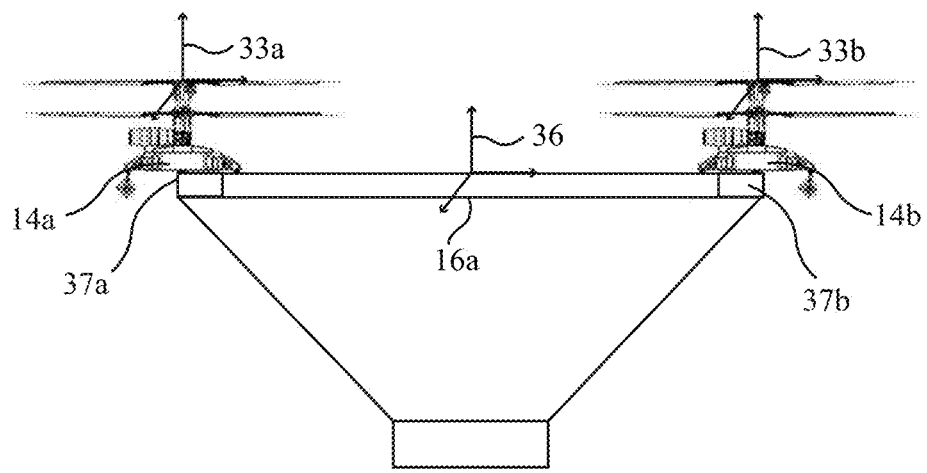
FIG. 9 is a schematic diagram of elements of a rigid connection of lift vehicles.

Similarly with a rigid connection, the details of lift vehicle interaction are shown in FIG. 9. Beam 16a is attached to the lift vehicles 14a and 14b with rigid connectors 37a and 37b such as mating quick connect flanges or bayonet connections. Lift vehicle 14a and lift vehicle 14b have collective for thrust control. In a MVC3 or MVC4 system, the lift vehicles can optionally have cyclic, but cyclic control would not be required since pitch and roll could be accommodated with differential collective control between lift vehicles. Again, total system coordinates are used to fly the cooperative lift vehicles in the MVC and for a triplet or quadruplet configuration, thrust on each lift vehicle is used to control total system pitch, yaw, roll control.

Figure 10:
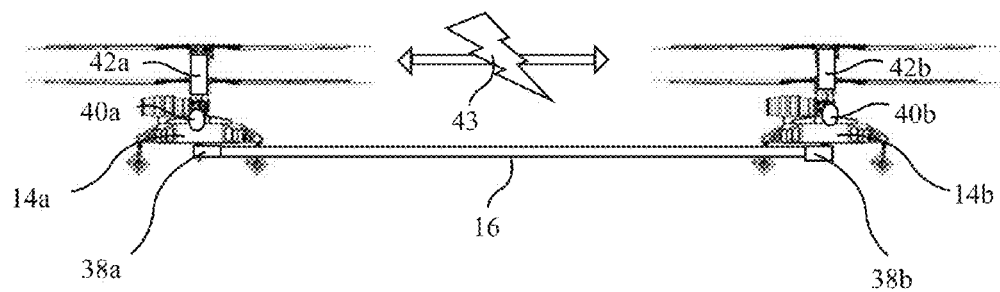
FIG. 10 is a schematic block diagram of the elements of the lift vehicle connection and control systems for cooperative control.

For rigid or semi-rigid lift vehicle connections, lift vehicle cyclic and collective are also controlled to limit static and dynamic forces imparted on the connecting structure. As shown in FIG. 10, load cell 38a and load cell 38b measure forces in the beam 16 during flight operations. The force data is measured sent to the onboard flight computer 40a and 40b in each vehicle. The onboard flight control computers 40a and 40b determine the collective or cyclic control for the respective vehicle required to minimize forces in the beam 16 and send control commands to the respective vehicle control system, 42a and 42b. Wireless communication link 43 between vehicles which may be a radio, WiFi or other link, shares loads and controls data to provide a feedback loop between vehicles to further minimize loads.

Figure 11:
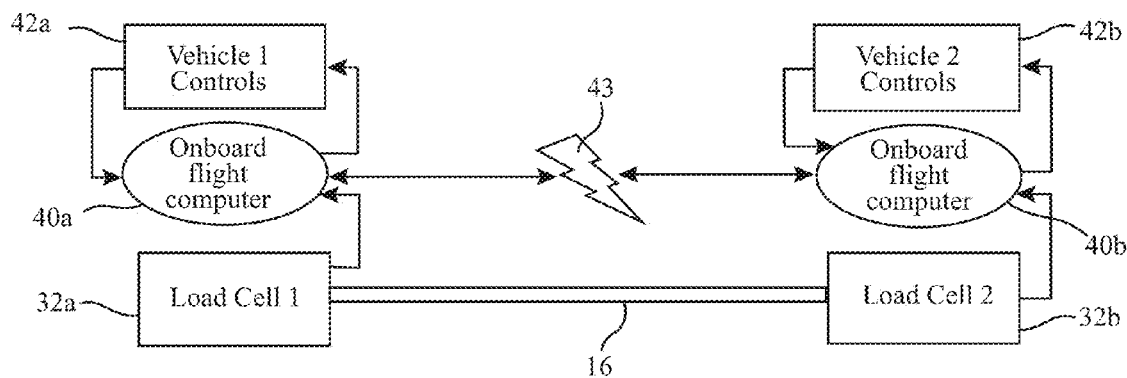
FIG. 11 is a block diagram of the operation of the control systems and instrumentation for cooperative control of the lift vehicles.

A feedback loop is established between the load cell forces and the vehicle control system to minimize connection loads as shown in FIG. 11. A feedback loop is established through the onboard flight computers 40a and 40b between the load cells 38a and 38b and the vehicle control systems, 42a and 42b reactive to the loads measured by the load cells to minimize connection loads on the beam 16. A feedback loop between vehicles using the wireless communication link 43 to adjust the cooperative control algorithms further minimizes loads.

Individual lift vehicles in the MVC incorporate visual, LIDAR or other sensing systems in the sensor suite 29 for lift vehicle location and navigation. Positioning between lift vehicles in the MVC flying with no physical connection between vehicles may be monitored by radar or laser ranging systems or similar devices with coded returns for identification of individual lift vehicles.

Figure 12:
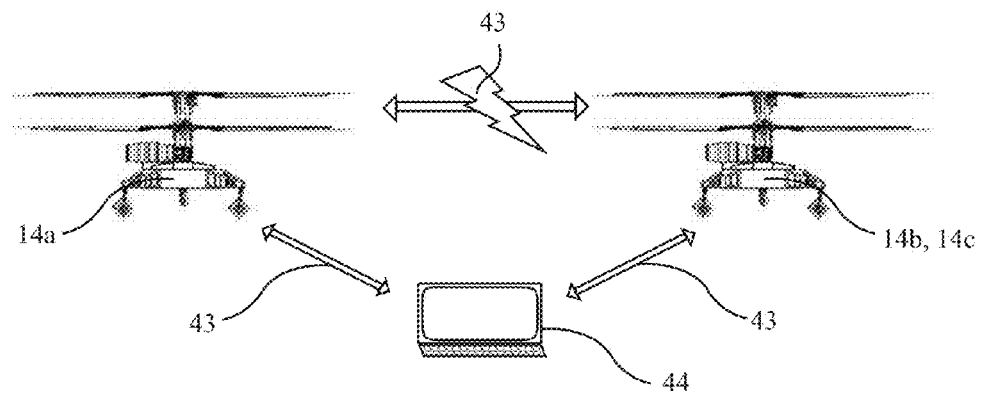
FIG. 12 is a schematic diagram of cooperative communications between the lift vehicles and a base station.

As previously described, all lift vehicles have radio receiver and transmitters or comparable communications capability to provide the wireless communications link 43. The sensor suites 29 on each vehicle gather data. As shown in FIG. 12 each lift vehicle 14a communicates with other lift vehicle(s) 14b in the MVC and a base station 44 over the wireless communications link 43. In example embodiments the based station is optimally a portable computer or hand held tablet device. The vehicles fly autonomously through a set path given by the base station. Collision avoidance is done through vehicle—to —vehicle communication when operating without physical connection. If physically connected with beams 16, the lift vehicles minimize loads in the beam however collision avoidance algorithms are not necessary. Handling of the load 12 is accomplished through commands from the base station 44 considering all lift vehicles state data.

Figure 13:
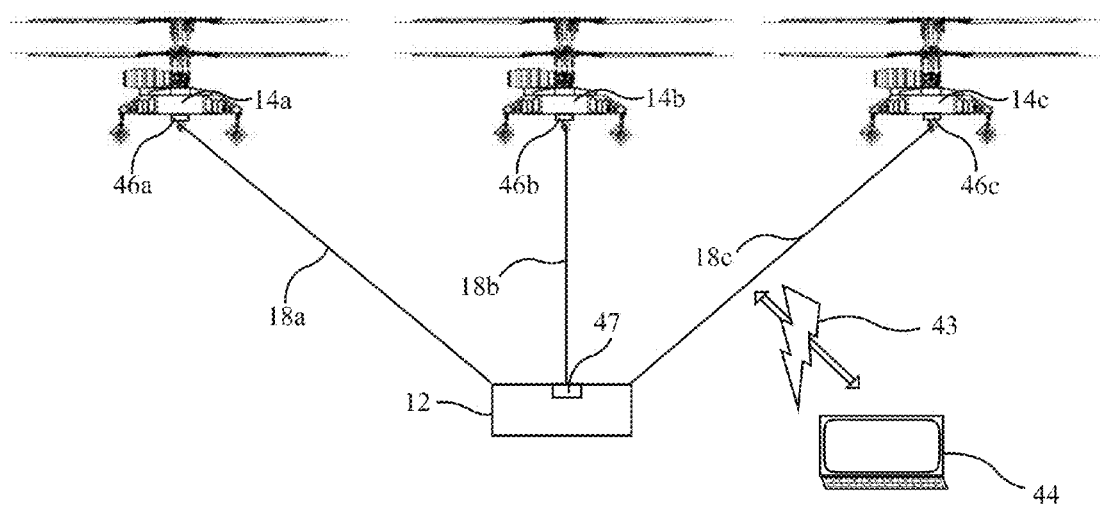
FIG. 13 is a schematic diagram of load handling by cooperating lift vehicles.

To accomplish load handling, as previously described, the sensor suite 29 in each lift vehicle has an onboard camera (or LIDAR) sensor (46a, 46b, 46c) to track the load and the other lift vehicles as represented in FIG. 13. Each lift vehicle 14a communicates with other lift vehicles 14b, 14c and the base station 44 on position of all elements. The base station 44 knows all positions through the onboard sensors and cameras and directs the MVC to position the lift vehicles over the load 12. A reflector 47, laser beacon or similar device may be present on the load to interface with the appropriate sensors on the lift vehicles. The load 12 is attached and detached via cables 18a, 18b and 18c between the lift vehicles and the load by ground personnel. Each lift vehicle is given specific position target positions by the base station for assembly into the MVC but can fly autonomously to reach those target positions. The master controller, which may be the base station 44 or an elected flight computer in the MVC minimizes forces in the cables by keeping lift vehicles close together but at a safe distance for wind gusts. The MVC is then directed to fly way points via GPS to transport and position the load 12.

Figure 14:
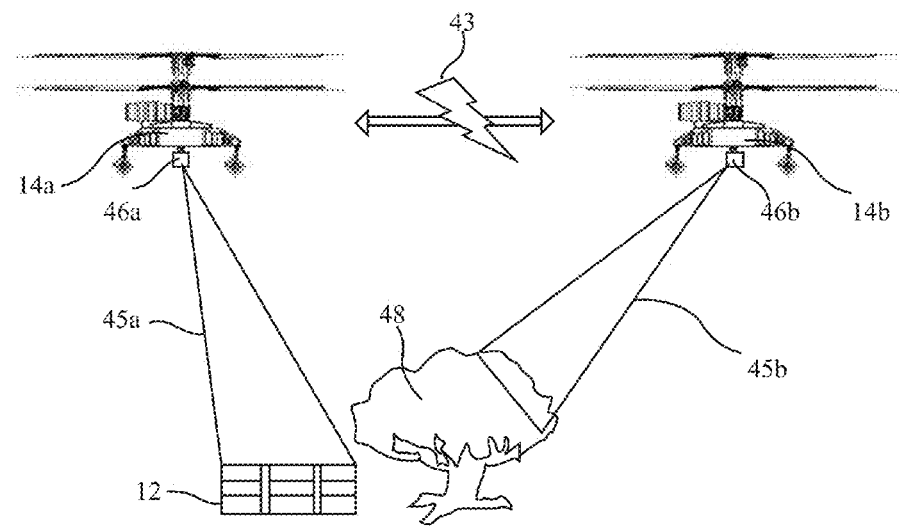
FIG. 14 is a representation of control interaction between cooperative lift vehicles with an obstructed view.

Lift vehicles in the MVC share data in order to compute an improved estimate of position and attitude in terms of accuracy and reliability over what would be possible with sensors on a single vehicle. (i.e., if one lift vehicle's landing spot camera view is obstructed, then data from other vehicle cameras can be used by all the vehicles). An example is shown in FIG. 14.

Vehicle 14a has a clear field of view 45a of the payload 12 and/or mission goal such as landing location with sensor 46a. Vehicle 14b has a field of view 45b for its sensor 46b of payload 12 or mission goal obstructed by tree 48. Vehicle 14a and vehicle 14b share sensor data through the wireless communication link. Vehicle 14a becomes the master node and directs lift vehicle 14b (or all lift vehicles in the MVC) to the payload or mission goal. A feedback loop is used between all lift vehicles to determine which has the best view or views, and combines for the most accurate spatial awareness.

Figure 15:
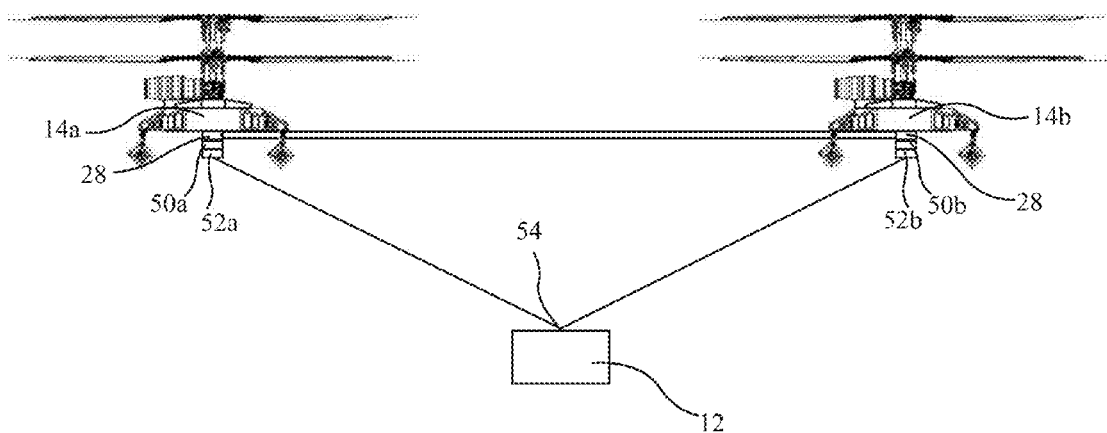
FIG. 15 is a schematic diagram of the emergency disconnect system for the cooperative lift vehicles; and, FIG. 16 is a flow chart of selection and operation of MVC configurations for matched loads.

In certain instances if anomalies arise with the MVC, anomalies with individual lift vehicles, load anomalies or other issues, emergency disconnect of the load may be required. As shown in FIG. 15, the interconnection and load support module 28 in each lift vehicle incorporates an emergency electrical disconnect (represented as elements 50a and 50b on lift vehicles 14a and 14b respectively). The emergency electrical disconnects are synchronized through the wireless communications system such that upon command, the load is simultaneously disconnected from all lift vehicles in the MVC. Normal mechanical automatic disconnects 52a and 52b provide for load connection at the individual lift vehicles 14a and 14b, respectively while a load normal disconnect 54 allows attachment of the cables 18a, 18b (or slings or other interconnection systems) to the load 12.

Figure 16:
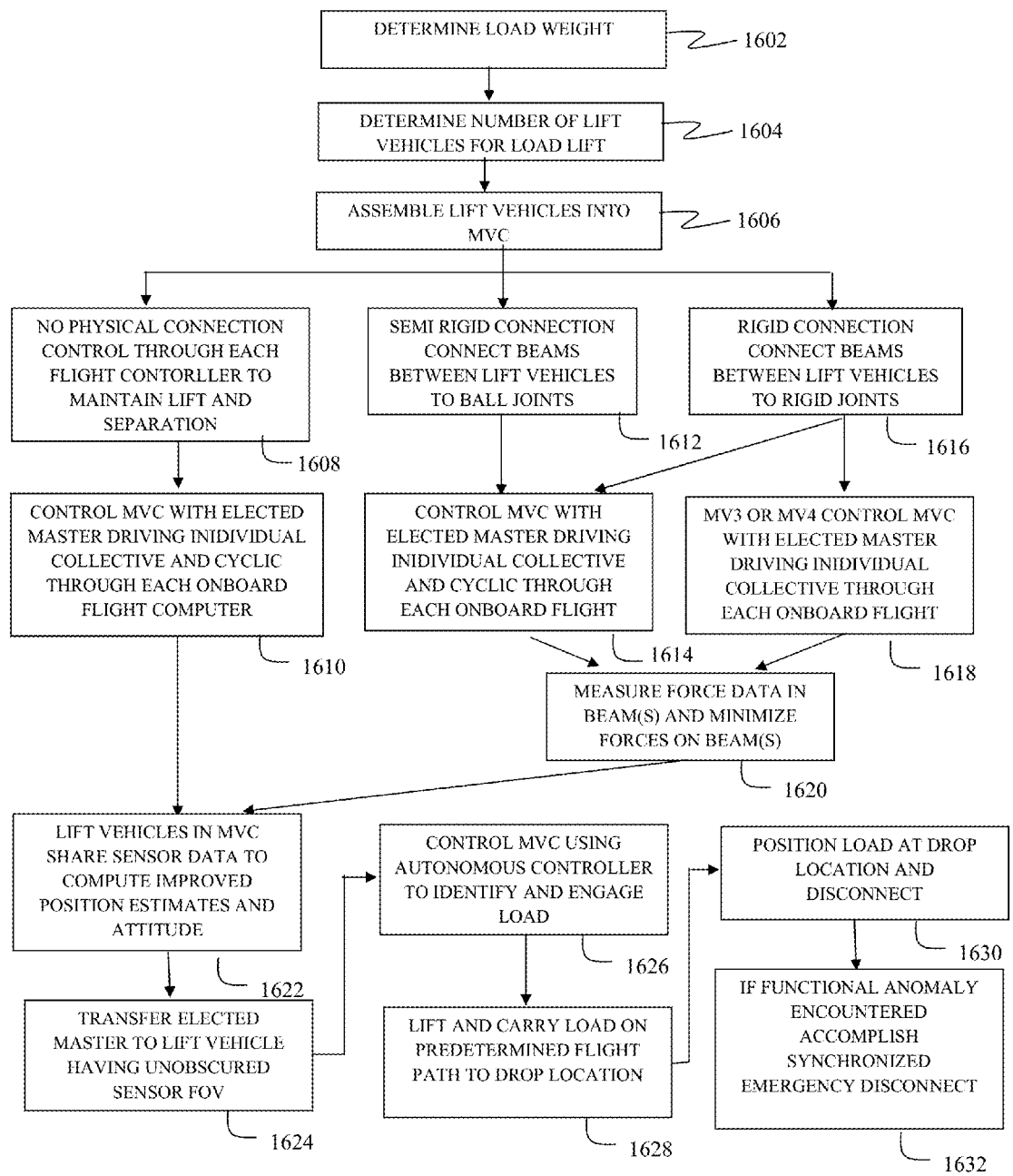

Configuration and operation of a selected MVC for carrying a desired load is shown in FIG. 16. A load weight and configuration is determined, step 1602, and a number of individual lift vehicles required to provide the necessary lift is selected, step 1604. The individual lift vehicles are assembled into a MVC, step 1606. If the MVC is to be operated without physical connection between lift vehicles, individual lift vehicle control is implemented through each vehicle onboard flight controller to maintain lift vehicle separation using vehicle encoded mutual range sensing, step 1608, and autonomous control of the MVC by the elected master controller is accomplished with individual collective and cyclic control of each lift vehicle by each onboard flight computer for MVC flight path control, step 1610. If the MVC is operated with physical connection with semi-rigid beams, the beams are connected between lift vehicles of the MVC to the ball joint in the interconnection and load support module of each lift vehicle, step 1612. Autonomous control of the MVC is accomplished by the master controller with individual collective and cyclic control of each lift vehicle by each onboard flight computer for MVC flight path control, step 1614. If the MVC is operated with physical connection with rigid beams, the beams are connected between lift vehicles of the MVC to the rigid connection in the in the interconnection and load support module of each lift vehicle, step 1616.

Connection of the air vehicles in the MVC may be automated. The user inputs payload requirement into an automated controller which may be the base station 44. For operation with no physical connection, a selected number of lift vehicles assemble themselves to lift desired payload amount. Alternatively, on the ground the desired number of lift vehicles may be positioned by a ground handling robot. The ground handling robot positions connection beams between designated lift vehicles. A quick disconnect system on each lift vehicle engages the connection beam(s) to create the MVC. The MVC is then ready for flight commands.

For MVC3 and MVC4 configurations, autonomous control of the MVC is accomplished with individual collective control of each lift vehicle by each onboard flight controller responsive to the autonomous controller for pitch and roll control of the MVC for MVC flight path control, step 1618. Force data at the beam connection is measured and the flight control computer in each lift vehicle provides flight control to minimize static and dynamic forces on the interconnecting beam(s), step 1620. Lift vehicles in the MVC share sensor data to compute an improved estimate of position and attitude in terms of accuracy and reliability, step 1622. Flight path guidance may be transferred to a lift vehicle having unobscured sensor field of view, step 1624.

Mission objectives may then be accomplished by controlling the MVC using the autonomous controller to identify and engage a load, step 1626. The load is then lifted and carried by the MVC under control of the autonomous controller on a predetermined flight path to a drop location, step 1628. The load is positioned at the drop location and disconnected, step 1630. If a functional anomaly is encountered, synchronized emergency disconnect may be accomplished, step 1632.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A cargo lift system, comprising:
   a plurality of unmanned vertical lift generating machines, each unmanned vertical lift generating machine having a coaxial counter rotating disc rotor and a fuselage base structure housing an unmanned sensor suite;
   an autonomous control system for controlling coordinated movements of the plurality of unmanned vertical lift generating machines;
   a coupling system for connecting the cargo to each of the plurality of unmanned vertical lift generating machines;
   load sensing attachments;
   wherein the plurality of unmanned vertical lift generating machines are separated from each other by a semi-rigid connection or a rigid connection wherein each unmanned vertical lift generating machine incorporates an onboard flight computer, said onboard flight computer, as a function of a configuration of the plurality of lift generating machines operating as a multiple vehicle configuration (MVC) and the position of the individual lift generating machine within the MVC, computes a desired attitude and position with respect to the other vehicles to minimize connection loads in the interconnection.

2. The cargo lift system of claim 1, further comprising a base station in communication with the autonomous control system, said autonomous control system responsive to a set path provided by the base station for autonomous operation; and, wherein the distance of separation between the plurality of unmanned vertical lift generating machines is maintained by individual flight control computers on each vertical lift generating machine responsive to a sensor in the unmanned sensor suite.

3. The cargo lift system of claim 1 wherein each vertical lift generating machine further comprises a ball joint for connection of a beam to provide the semi-rigid connection.

4. The cargo lift system of claim 1 wherein each vertical lift generating machine further comprises a rigid connector for connection of a beam to provide the rigid connection.

5. The cargo lift system of claim 1 wherein each vertical lift generating machine further comprises an onboard flight computer and said autonomous control system comprises a master controller selected as an elected one of the onboard flight computers.

6. The cargo lift system of claim 5 wherein each vertical lift generating machine further comprises flight controls responsive to the onboard flight computer.

7. The cargo lift system of claim 6 wherein each onboard flight computer adjusts, as a function of a configuration of the plurality of lift generating machines operating as a multiple vehicle configuration (MVC) and the position of the individual lift generating machine within the MVC, to compute a desired attitude and position with respect to the other vehicles to minimize connection loads in the interconnection.

8. The cargo lift system of claim 7 the plurality of unmanned vertical lift generating machines comprises at least two lift generating machines and the flight controls comprise cyclic and collective, said master controller providing flight path control through each individual onboard flight computer for thrust, pitch, roll and yaw of the respective lift generating machine using cyclic and collective.

9. The cargo lift system of claim 7 wherein the plurality of unmanned vertical lift generating machines comprises at least three lift generating machines and the flight controls comprise collective, said mater controller providing flight path control through each individual onboard flight computer for thrust using collective.

10. A cargo lift system comprising:
    a plurality of unmanned vertical lift generating machines separated from each, other by a distance and each vertical lift generating machine further comprises an onboard flight computer and flight controls responsive to the onboard flight computer;

a master controller selected as an elected one of the onboard flight computers, said master controller coordinated movements of the plurality of unmanned vertical lift generating machines;

wherein each onboard flight computer adjusts, as a function of a configuration of the plurality of lift generating machines operating as a multiple vehicle configuration (MVC) and the position of the individual lift generating machine within the MVC, to compute a desired attitude and position with respect to the other vehicles;

a coupling system for connecting a cargo to each of the plurality of unmanned vertical lift generating machines;

wherein the plurality of unmanned vertical lift generating machines are separated from each other by beams and further comprise load sensing attachments for the beams, said onboard flight computers controlling the flight controls to limit static and dynamic forces imparted on the beams as measured by the load sensing attachments.

11. A method for cargo lift comprising:
determining a load weight and configuration;
selecting a number of individual lift vehicles required to provide the necessary lift, each lift vehicle having a coaxial counter rotating disc rotor and a fuselage base structure housing an unmanned sensor suite;
assembling the individual lift vehicles into a multiple vehicle configuration (MVC) by interconnection through a selected one of a semi-rigid connection or a rigid connection;
measuring force data at the connection; and,
providing autonomous control of the MVC by an elected master controller with individual collective and cyclic control of each lift vehicle by an onboard flight computer for MVC flight path control and a desired attitude and position with respect to the other vehicles to minimize connection loads in the interconnection.

12. The method of claim 11 further comprising implementing individual lift vehicle control through an onboard flight controller in each lift vehicle to maintain lift vehicle separation using vehicle encoded mutual range sensing.

13. The method of claim 11 further comprising:
physically connecting the individual lift vehicles with rigid beams; and,
providing autonomous control of the MVC by the master controller with individual collective and cyclic control of each lift vehicle by each onboard flight computer for MVC flight path control and to minimize connection loads in the beams.

14. The method of claim 13 further comprising:
accomplishing autonomous control of the MVC for MVCs with three or four lift vehicles with individual collective control of each lift vehicle by each onboard flight controller responsive to the autonomous controller for pitch and roll control of the MVC for MVC flight path control.

15. The method of claim 13 further comprising accomplishing a synchronized emergency disconnect if a functional anomaly is encountered.

16. The method of claim 11 further comprising sharing sensor data between lift vehicles in the MVC to compute an improved estimate of position and attitude in terms of accuracy and reliability and transferring flight path guidance to a lift vehicle having unobscured sensor field of view.

17. The method of claim 11 further comprising:
controlling the MVC using the autonomous controller to identify and engage a load;
lifting the load and carrying the load by the MVC under control of the autonomous controller on a predetermined flight path to a drop location;
positioning the load at the drop location; and
disconnecting the load.

18. A method for cargo lift comprising;
determining a load weight and configuration;
selecting a number of individual lift vehicles required to provide the necessary lift;
implementing individual lift vehicle control through an onboard flight controller in each lift vehicle to maintain lift vehicle separation using vehicle encoded mutual range sensing;
assembling the individual lift vehicles with a beam connection into a multiple vehicle configuration (MVC); and,
providing autonomous control of the MVC by an elected master controller with individual collective and cyclic control of each lift vehicle by the onboard flight computer for MVC flight path control; and,
measuring force data at the beam connection and providing flight control with the flight control computer in each lift vehicle to minimize static and dynamic forces on the interconnecting beam.

19. A method for cargo lift comprising;
determining a load weight and configuration;
selecting a number of individual lift vehicles required to provide the necessary lift;
assembling the individual lift vehicles into a multiple vehicle configuration (MVC) by
positioning a selected number of lift vehicles with a ground robot;
positioning beams intermediate the lift vehicles with the ground robot; and,
interconnecting the lift vehicles with the beams using quick disconnects; and,
providing autonomous control of the MVC by an elected master controller with individual collective and cyclic control of each lift vehicle by an onboard flight computer for MVC flight path control.

* * * * *